3,660,316
POLYEPOXIDE BISUREA ADHESIVE COMPOSITION CONTAINING A 1 - CYANO - 3-(LOWER ALKYL) GUANIDINE AS AUXILIARY CURING AGENT

Frederic Charles Schaefer, Darien, and James Sterling Noland, Greenwich, Conn., assignors to American Cyanamid Company, Stamford, Conn.
No Drawing. Filed Nov. 20, 1970, Ser. No. 91,594
Int. Cl. C08g 30/14
U.S. Cl. 260—2 N        6 Claims

ABSTRACT OF THE DISCLOSURE

Compositions which consist essentially of an organic polyepoxide having at least two reactive 1:2-epoxy groups, a bisurea curing agent and a 1-cyano-3-(lower alkyl) guanidine as auxiliary curing agent for useful stability at room temperature yet thermoset at 180° F., making this composition specially useful as an adhesive for aluminum.

---

The present invention relates to low temperature-curable polyepoxide compositions of excellent storage capability, and particularly relates to subject compositions containing a mixture of curing agents which provides low-temperature curing plus high bonding strength.

At the present time wing and fuselage sections of military and commercial aircraft are composed of aluminum honeycomb each side of which carries an aluminum sheet as strengthening member. These sections have high strength/weight ratios, and are fabricated by adhering a sheet of aluminum to each side of an aluminum honeycomb, the honeycomb being first machined as necessary to produce the desired shape. The adhesives used for this purpose must set rapidly and must possess high resistance to peel and creep at elevated temperatures. They are typically organic polyepoxides having at least two 1,2-epoxy groups and contain a bisurea as curing agent; cf. Nawakowski et al. U.S. Pats. Nos. 3,386,955 and 3,386,956. They are not storage-stable and are therefore customarily shipped in Dry Ice (solid carbon dioxide).

The step of adhering aluminum sheets to aluminum honeycomb requires in each instance that the sheets be strongly and uniformly pressed against the honeycomb while at a temperature of 250° F. or higher. Up to the present the adhering step has been performed by placing the honeycomb-aluminum sheet assembly in a conforming air-impermeable bag, evacuating the air from the bag so as to cause the walls of the bag to lie smoothly along the aluminum sheeting, placing the bag (with contents) in an autoclave, and introducing a hot liquid or gas into the autoclave to achieve the necessary temperature and pressure for cure. The autoclaves used for this purpose are of very large size, since they must contain large portions of large aircraft.

It is a disadvantage of the process that the procedure is slow and requires an unduly large amount of heat. The autoclave must go through a substantially complete heating and cooling cycle for each batch, so that all the heat is lost, and moreover, a considerable time is needed to heat the autoclave to curing temperature.

The foregoing difficulties are obviated by the present invention which is based on the discovery that the 1-cyano-3-(lower alkyl)guanidines act as auxiliary curing agents for the bisurea curing agents which the aforesaid adhesive compositions normally contain. We have found that the presence of even a very minor amount of one of these guanidines decreases the cure temperature of polyepoxides to 180° F. It accordingly becomes practical to perform the bonding step by subjecting the evacuated plastic bags (containing the honeycomb assemblies) to heated water of depth sufficient to provide the necessary pressure hydrostatically. As a result, autoclaves are no longer necessary, and no heat need be lost from batch to batch as the plastic bags can be introduced or removed with simple hoisting devices, all the water used remaining in place at constant temperature.

Our invention is accordingly an adhesive composition which consists essentially of an organic polyepoxide having at least two 1,2-epoxy groups, an effective amount of a bisurea catalyst for said epoxy groups, and an effective amount of a 1-cyano-2-(lower alkyl)guanidine as auxiliary curing agent. The composition can be in the form of a fluid paste, or in the form of a continuous film.

The manner in which said guanidine supplements or fortifies the activity of the bisurea component as curing agent is not known, and applicants do not wish to be limited by any theory.

The compositions of the present invention in preferred embodiments also possess the additional advantage of useful storage stability. They are stable for about a week at 90° F. This permits them to be used without need for refrigeration during fabrication of parts.

The polyepoxides which have been referred to are described in the aforesaid patents and are well known to those in the art, and in general are prepared by reacting a polyhydric phenol (e.g. resorcinol, bisphenol A) or a polyhydric alcohol (e.g. mannitol) with epichlorohydrin. The epoxy substituents have the theoretical formula

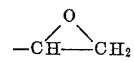

the unsatisfied valence being attached to one of the phenolic or alcoholic oxygen atoms of the parent compound. It follows that the designation "1,2'" requires that the epoxy group shown above be in a terminal position.

Numerous suitable polyepoxy compounds are disclosed in said patents together with methods for the preparation thereof. The patents are accordingly incorporated in this specification by reference.

The aforesaid polyepoxy compounds are formulated into adhesives by admixture with one or more bisurea curing agents, in any convenient manner. Commonly a volatile organic liquid is incorporated into the polyepoxy compound to decrease its viscosity and to improve its mixability with the polyurea. The resulting composition is applied to the surfaces to be joined, and the resulting assembly is then maintained under pressure and at elevated temperature until the curing agent has cross-linked the polyepoxy molecules together.

The bisureas used as curing agents are compounds which carry two or more ureido substituents. Such substituents have the formula

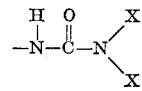

wherein the X's represent non-reactive groups, for example, alkyl, phenyl, etc. Typical such polyureas include phenylenebisurea, methylphenylenebisurea, and methylenebisurea, as well as the more complex bisureas, for example, 1,1' - (4 - methyl-m-phenylene)-bis[3,3-dimethylurea]. Numerous polyureas suitable for use as curing agents and methods for the preparation thereof are disclosed in said patents. They vary in effectiveness from instance to instance, but in general an amount between about 1 and 20 parts based on the weight of the polyepoxy compound, is suitable. In any event a suitable amount can be found by trial.

According to the present invention a 1-cyano-3,3-(lower alkyl)guanidine is present in the above-described adhesive compositions in amount sufficient to provide the desired depression in cure temperature or acceleration in cure rate.

Suitable 1-cyano-3,3-(lower alkyl)guanidines include 1-cyano - 3,3 - dimethylguanidine, 1-cyano-3,3-diethylguanidine, and other similar guanidines wherein the alkyl substituents contain fewer than four carbon atoms.

Very satisfactory results have been achieved when the guanidines are present in amount between 1% and 50% of the weight of the bisurea curing agents, and amounts in the range 10–30% are preferred. Suitable amount can be found by laboratory trial.

The compositions of the present invention are conveniently prepared in the same mannner as the polyepoxide-bisurea composition, after which part or all of the solvent can be of the aforesaid patents. The 1-cyano-3-(lower alkyl)guanidines (including 1 - cyano-3-methylguanidine) enter into the compositions in the same manner as the bisureas. Thus, the composition of the present invention can be prepared as a fluid or pasty cement, or it can be prepared in dry (solid) form as a powder or film. The composition in film form can be prepared by flowing the composition (containing sufficient solvent to render it fluid) upon glass, polyethylene or other release surface, evaporating the solvent preferably at low temperature under vacuum, and stripping off the film. The solvents depend upon the specific polyepoxides and polyureas present, and suitable solvents for specific instances are shown in the cited patents and in the examples which follow.

The aforesaid films can be interleaved with a release film and formed into rolls or stacks for shipment. The film can then be cut into shapes conformable to the shapes of the surfaces to be joined.

A variety of materials may be present which are customarily present in adhesive compositions of the above-described type and which do not change their essential character. A modifier, for example, butadiene-acrylonitrile synthetic rubber, is advantageously incorporated into the mix and renders the film more pliable and thus more easily formed into a roll. Moreover, the composition may include non-reactive pigments (e.g. titanium dioxide and carbon black) to give the compositions a distinctive color so as to make evident their presence of the surface to be cemented, a perfume to mask the odor of the components present, and plasticizers such as nylon and castor oil to render the film and the composition in thermoset state more flexible.

The invention is more particularly described by the examples which follow. These examples constitute specific embodiments of the invention and are not to be construed in limitation thereof.

EXAMPLE 1

The following illustrates the formulation of an adhesive composition of the present invention which sets rapidly and strongly at 180° F.

To a solution of (a) 65 g. of a bisphenol diglycidyl ether diepoxide (Dow 661 manufactured by Dow Chemical Co.) having the theoretical formula:

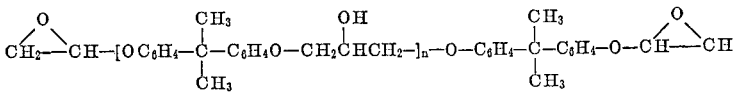

wherein $n$ is about 2.5, and having an average molecular weight of about 525 and (b) 35 g. of a diepoxide having the same theoretical formula except that $n$ is about 0.15 (Dow 331) in (c) 60 g. of ethylene dichloride is added, with good stirring at room temperature, a mixture ground to 200 mesh of 6 g. of 1,1-m-tolylenebis-(3,3-dimethylurea) and 15 g. of 1,1-o-phenylenebis(3,3-dimethylurea) as catalysts and 2 g. of 1-cyano-(3,3-dimethyl)guanidine as auxiliary catalyst.

A solution forms which is cast on glass to form a film having a thickness of about 10 mils which is allowed to stand at room temperature for 2 hours until apparently dry, and is then placed for 90 minutes in a forced draft oven at 130° F. to remove residual solvent. The film is stripped from the glass and is flexible.

The bonding properties of the composition are determined by standard laboratory procedure. A portion of the film is placed over a section of standard aluminum aircraft wing core material 3″ x 8″ x 0.5″ which had been cleaned in chromic acid to remove all organic material, and over this is placed a 3″ x 8″ sheet of standard airplane wing skin (similarly cleaned) composed of an aluminum alloy core sheet carrying sheet aluminum as a cladding on both sides (total thickness 0.13″). The assembly is cured at 180° F. under a pressure of 40 lbs./in.$^2$ for two hours in an electricallly heated hydraulic press. The skin is normally strongly bonded to the honeycomb core, infrared analysis of the cured adhesive shows that 95% of the epoxy groups have reacted.

EXAMPLE 2

The procedure of Example 1 for the preparation of a film of the adhesive composition is repeated except that 15 g. of a toughening agent (Hycar 1472, an acrylonitrile-butadiene synthetic rubber the chains of which carry functional carboxy groups) is added to improve the peel properties of the composition in thermoset state. The synthetic rubber dissolves easily in the solution, and the solution is compatible therewith.

The bonding properties of the film are determined by placing it between a ½″ lap joint of the aluminum-clad skin material of Example 1 and hot pressing the assembly for 2 hours at 180° F. under a pressure of 40 lb./in.$^2$, as in Example 1. On cooling the joint has a lap shear strength of 6,000 lb./in.$^2$ at 75° F. and a T-peel strength of 30 in.-lbs./in.

EXAMPLE 3

The following illustrates the preparation of a different adhesive composition illustrating its storage stability, and outstanding resistance to creep at 180° F.

A mixture is prepared from 55 g. of an epoxy compound corresponding to that of Example 1 except that $n$ is 5 to 6 (Dow Epoxy Resin 664), 45 g. of Dow Epoxy Resin 331 and 12 g. of a modifier mixture composed of 8 g. of Hycar 1472 and 4 g. of Hycar CTBN, a liquid acrylonitrile-butadiene rubber with carboxy terminal groups.

This mixture is dissolved in 65 g. methylene chloride, and to the resulting solution is added a mixture ground to −100 mesh composed of 13 g. of 1,1-m-tolylenebis(3,3-dimethylurea) and 5 g. of 1,1-o-phenylenebis(3,3-dimethylurea) as curing agents, and 3 g. of 1-cyano-1,1-dimethylguanidine as supplementary curing agent.

The resulting homogenous solution is cast and dried to form a film according to Example 1. The resulting film is apparently dry and non-tacky, and is stored for 6 days at 90° F.

The adhesive properties of the film are determined according to Example 1. Results are substantially the same. The laminate has a peel value according to ASTM test D–1781–62 of 68 in.-lb./3 in. and a creep value according to Military Specification Mil-A–25463 of 0.018″ in 192 hours at 180° F.

We claim:

1. A composition consisting essentially of an organic polyepoxide having at least two reactive 1,2-epoxy groups, a bisurea curing agent for said polyepoxide, and an effective amount between 1% and 50% based on the weight of said bisurea curing agent of a 1-cyano-3-(lower alkyl) guanidine as auxiliary curing agent for said bisurea.

2. A composition according to claim 1 wherein the auxiliary curing agent is 1-cyano-3-methylguanidine.

3. A composition according to claim 1 wherein the auxiliary curing agent is 1-cyano-3,3-dimethylguanidine.

4. A composition according to claim 1 wherein the auxiliary curing agent is 1-cyano-3,3-diethylguanidine.

5. A composition according to claim 1 wherein the weight of the auxiliary curing agent is between 10% and 30% of the weight of the bisurea.

6. A composition according to claim 1 in film form.

References Cited

UNITED STATES PATENTS

| | | | |
|---|---|---|---|
| 3,386,955 | 6/1968 | Nawakowski et al. | 260—47 EN |
| 3,028,342 | 4/1962 | Katz et al. | 260—47 EN |
| 3,386,956 | 6/1968 | Nawakowski et al | 260—47 EN |

WILLIAM H. SHORT, Primary Examiner

T. E. PERTILLA, Assistant Examiner

U.S. Cl. X.R.

117—124 E, 127, 161 ZB; 161—185, 186; 260—18 Ep, 32.6 R, 37 Ep, 47 EN, 830 TW, 836

Case 23,193   UNITED STATES PATENT OFFICE
CERTIFICATE OF CORRECTION

Patent No. 3,660,316                Dated May 2, 1972

Inventor(s) Frederic Charles Schaefer and James Sterling Noland

It is certified that error appears in the above-identified patent and that said Letters Patent are hereby corrected as shown below:

Column 3 line 72, "200 mesh" should read -- -200 mesh --.

Signed and sealed this 26th day of September 1972.

(SEAL)
Attest:

EDWARD M. FLETCHER, JR.              ROBERT GOTTSCHALK
Attesting Officer                    Commissioner of Patents